United States Patent
Anglin et al.

(10) Patent No.: US 7,506,214 B2
(45) Date of Patent: Mar. 17, 2009

(54) APPLICATION FOR DIAGNOSING AND REPORTING STATUS OF AN ADAPTER

(75) Inventors: Debbie Ann Anglin, Austin, TX (US); Howard Neil Anglin, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 567 days.

(21) Appl. No.: 10/829,832

(22) Filed: Apr. 22, 2004

(65) Prior Publication Data

US 2005/0257100 A1 Nov. 17, 2005

(51) Int. Cl.
*G06F 11/00* (2006.01)

(52) U.S. Cl. .............. 714/43; 714/44; 714/48; 714/45

(58) Field of Classification Search .......... 714/56, 714/43, 44
See application file for complete search history.

(56) References Cited

U.S. PATENT DOCUMENTS

| | | | | |
|---|---|---|---|---|
| 4,975,829 A * | 12/1990 | Clarey et al. | ............ | 703/24 |
| 5,003,573 A * | 3/1991 | Agah et al. | ............ | 379/27.01 |
| 5,150,402 A * | 9/1992 | Yamada | ............ | 379/93.06 |
| 5,390,299 A * | 2/1995 | Rege et al. | ............ | 709/234 |
| 5,548,731 A * | 8/1996 | Chang et al. | ............ | 710/100 |
| 5,640,541 A * | 6/1997 | Bartram et al. | ............ | 703/26 |
| 5,657,455 A * | 8/1997 | Gates et al. | ............ | 710/100 |
| 5,877,819 A * | 3/1999 | Branson | ............ | 348/701 |
| 5,978,912 A * | 11/1999 | Rakavy et al. | ............ | 713/2 |
| 6,223,234 B1 * | 4/2001 | Mahalingam | ............ | 710/302 |
| 6,249,828 B1 * | 6/2001 | Wallach et al. | ............ | 710/302 |
| 6,272,551 B1 * | 8/2001 | Martin et al. | ............ | 709/250 |
| 6,279,125 B1 * | 8/2001 | Klein | ............ | 714/38 |
| 6,324,644 B1 * | 11/2001 | Rakavy et al. | ............ | 713/1 |
| 6,539,338 B1 * | 3/2003 | Pickreign et al. | ............ | 702/185 |
| 6,668,205 B1 * | 12/2003 | Ueno | ............ | 700/96 |
| 6,892,321 B2 * | 5/2005 | Chen | ............ | 714/25 |
| 6,915,343 B1 * | 7/2005 | Brewer et al. | ............ | 709/224 |
| 6,990,424 B2 * | 1/2006 | Clegg et al. | ............ | 702/124 |
| 7,026,913 B2 * | 4/2006 | Bhyravabhotla | ............ | 340/5.91 |
| 7,103,783 B1 * | 9/2006 | Friedman et al. | ............ | 726/15 |
| 7,206,977 B2 * | 4/2007 | Okunseinde et al. | ............ | 714/47 |
| 7,275,175 B2 * | 9/2007 | Cardona et al. | ............ | 714/4 |
| 7,418,716 B2 * | 8/2008 | Montecalvo et al. | ............ | 719/321 |
| 2002/0000464 A1 * | 1/2002 | Ramberg et al. | ............ | 235/375 |
| 2002/0046246 A1 * | 4/2002 | Wright et al. | ............ | 709/206 |
| 2002/0184576 A1 * | 12/2002 | Arndt et al. | ............ | 714/48 |
| 2003/0018926 A1 * | 1/2003 | Chen | ............ | 714/4 |
| 2003/0041179 A1 * | 2/2003 | Snead et al. | ............ | 709/321 |
| 2003/0126315 A1 * | 7/2003 | Tan et al. | ............ | 710/1 |
| 2003/0163298 A1 * | 8/2003 | Odom et al. | ............ | 703/21 |

(Continued)

*Primary Examiner*—Scott T. Baderman
*Assistant Examiner*—Loan Truong
(74) *Attorney, Agent, or Firm*—Yee & Associates, P.C.; Diana L. Roberts-Gerhardt

(57) ABSTRACT

Method, apparatus, system and computer program product for analyzing and reporting the status of an adapter in a data processing system. The system includes a service application having the capability of providing a variety of service functions to permit data to be captured regarding the status of the adapter, and a communication structure to permit data to be transmitted to and received from the service application. The analyzing and reporting system of the invention facilitates the reporting and diagnosis of adapter problems so that encountered problems can be better understood and more easily corrected.

21 Claims, 3 Drawing Sheets

U.S. PATENT DOCUMENTS

| | | | |
|---|---|---|---|
| 2003/0172368 A1* | 9/2003 | Alumbaugh et al. | 717/106 |
| 2003/0197485 A1* | 10/2003 | Miller et al. | 320/112 |
| 2004/0073848 A1* | 4/2004 | Pfeifer et al. | 714/43 |
| 2004/0225775 A1* | 11/2004 | Pellegrino et al. | 710/200 |
| 2005/0010837 A1* | 1/2005 | Gallagher et al. | 714/100 |
| 2005/0028156 A1* | 2/2005 | Hammond et al. | 718/100 |
| 2005/0096805 A1* | 5/2005 | Fudali et al. | 701/29 |
| 2005/0193285 A1* | 9/2005 | Jeon | 714/48 |

* cited by examiner

APPLICATION FOR DIAGNOSING AND REPORTING STATUS OF AN ADAPTER

BACKGROUND OF THE INVENTION

1. Technical Field

The present invention relates generally to the data processing field, and, more particularly, to a method, apparatus and system for analyzing and reporting the status of an adapter in a data processing system.

2. Description of Related Art

When a problem occurs in an adapter in a data processing system, various diagnostic procedures can be performed to capture data needed to analyze and correct the problem. For example, when an adapter problem is encountered, a developer or a manufacturer may wish to dump specific controller chip registers or configuration registers on the adapter, or to change the values of certain registers, to see if the problem will disappear; or, at least, to obtain a better understanding of the nature of the problem.

The mechanisms required to dump controller chip registers or configuration registers, or to perform other diagnostic procedures needed to analyze an adapter problem, however, are normally not included in the device driver for the adapter because these mechanisms are not needed for normal adapter operation. Accordingly, in order to properly analyze an adapter problem, a manufacturer or a developer is often required to modify the adapter's device driver so as to provide the necessary mechanisms to allow the desired diagnostic procedures to be performed.

Often, more than one version of a device driver must be provided to enable an adapter problem to be fully analyzed. For example, during debugging of a system under development, a developer is often required to provide numerous versions of a device driver in order to capture all the data needed to fully understand and solve a particular problem; and this can become a very time consuming task.

In addition, if an adapter problem occurs on a machine that is located in the field, such as at a customer's facility, the customer often must physically remove the adapter from the machine and send it back to the manufacturer in order to have the problem analyzed and corrected. This can result in delays in correcting the problem and cause significant inconvenience to the customer.

Therefore, it would be advantageous to have an improved method and apparatus for analyzing and reporting the status of an adapter.

SUMMARY OF THE INVENTION

The present invention provides a method, apparatus, system and computer program product for analyzing and reporting the status of an adapter in a data processing system. The system includes a service application that provides a variety of service functions to permit data to be captured regarding the status of the adapter, and a communication structure to permit data to be transmitted to and received from the service application. The analyzing and reporting system of the invention facilitates the reporting and diagnosis of adapter problems so that encountered problems can be better understood and more easily corrected.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
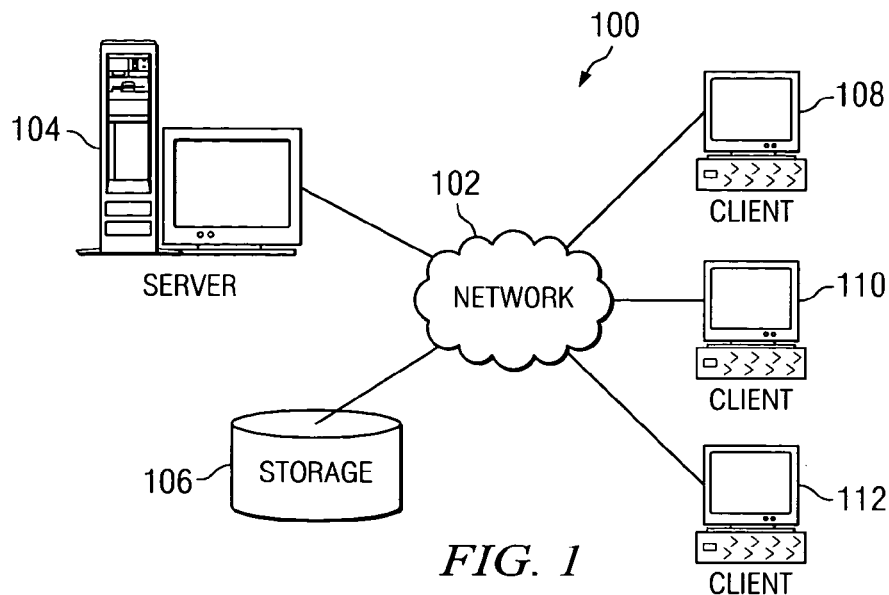
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
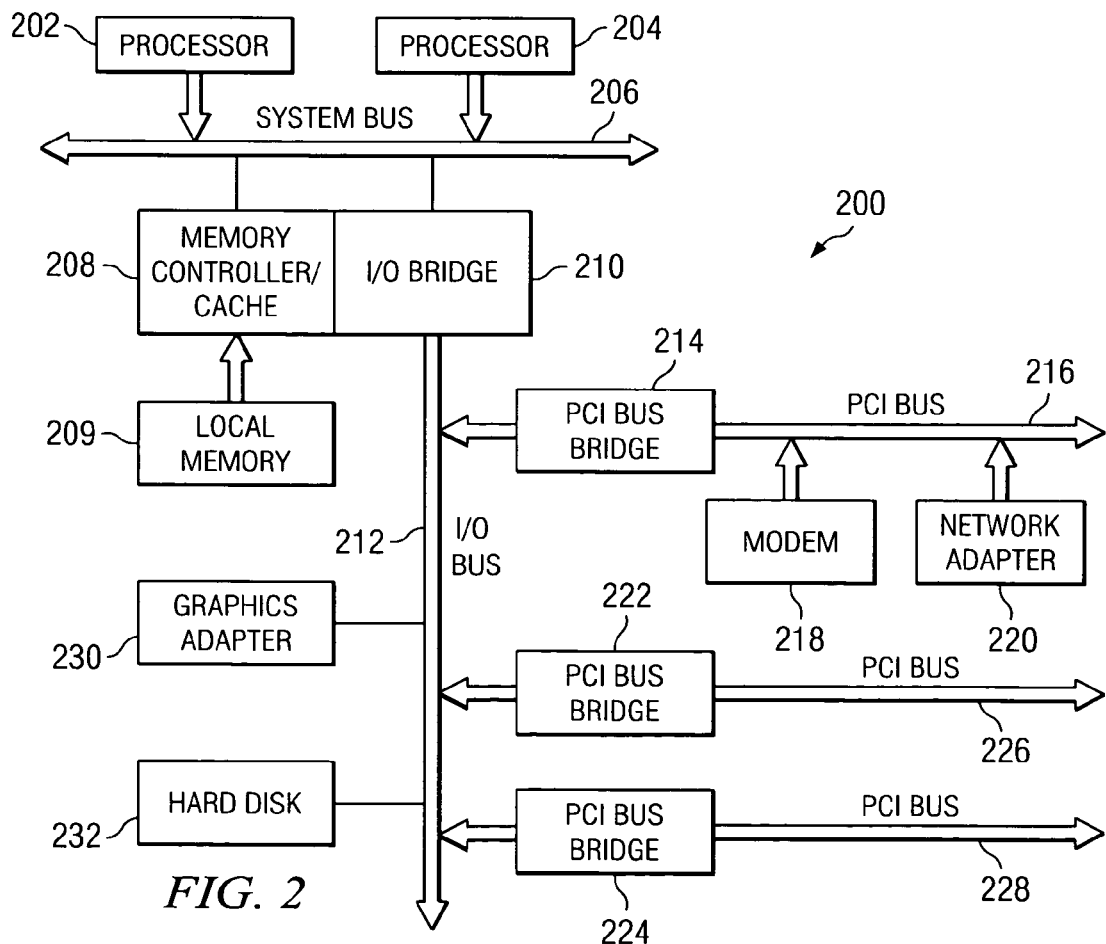
FIG. 2 is a block diagram of a data processing system that may be implemented as a server in the network of data processing systems of FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
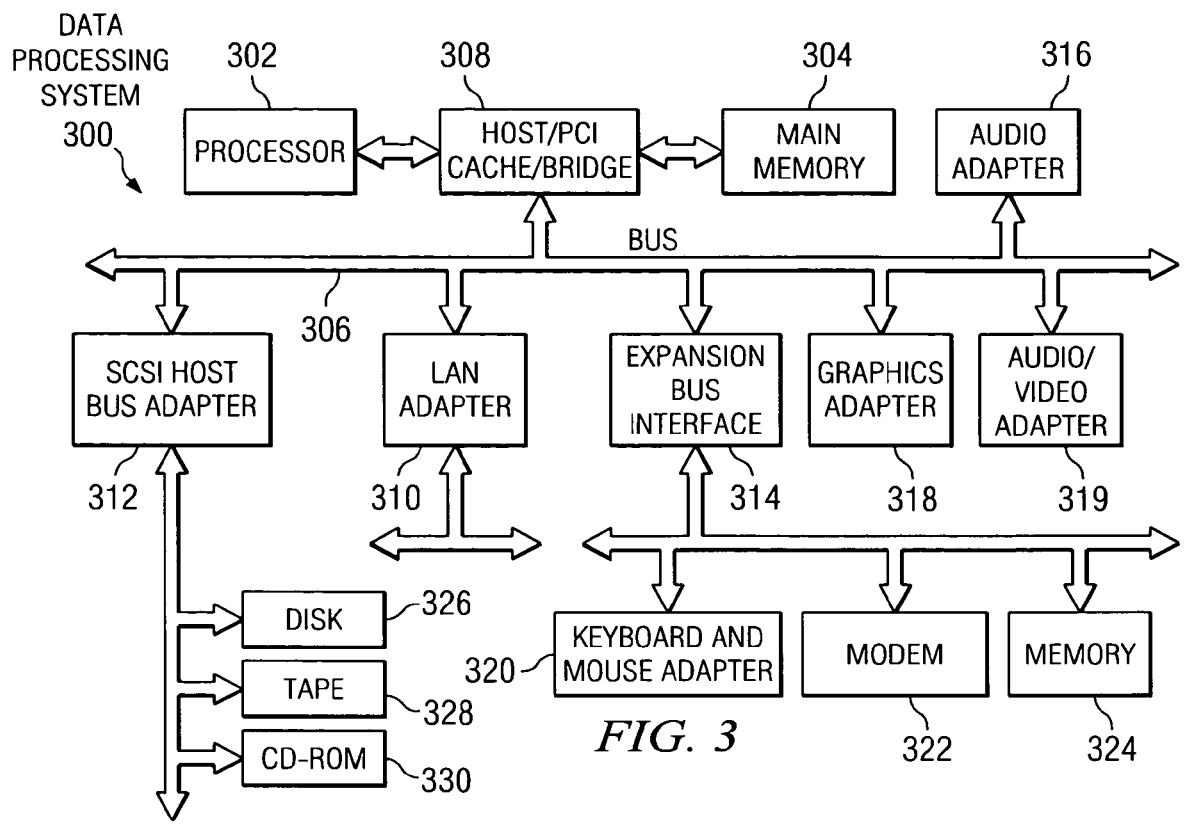
FIG. 3 is a block diagram of a data processing system that may be implemented as a client in the network of data processing systems of FIG. 1.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
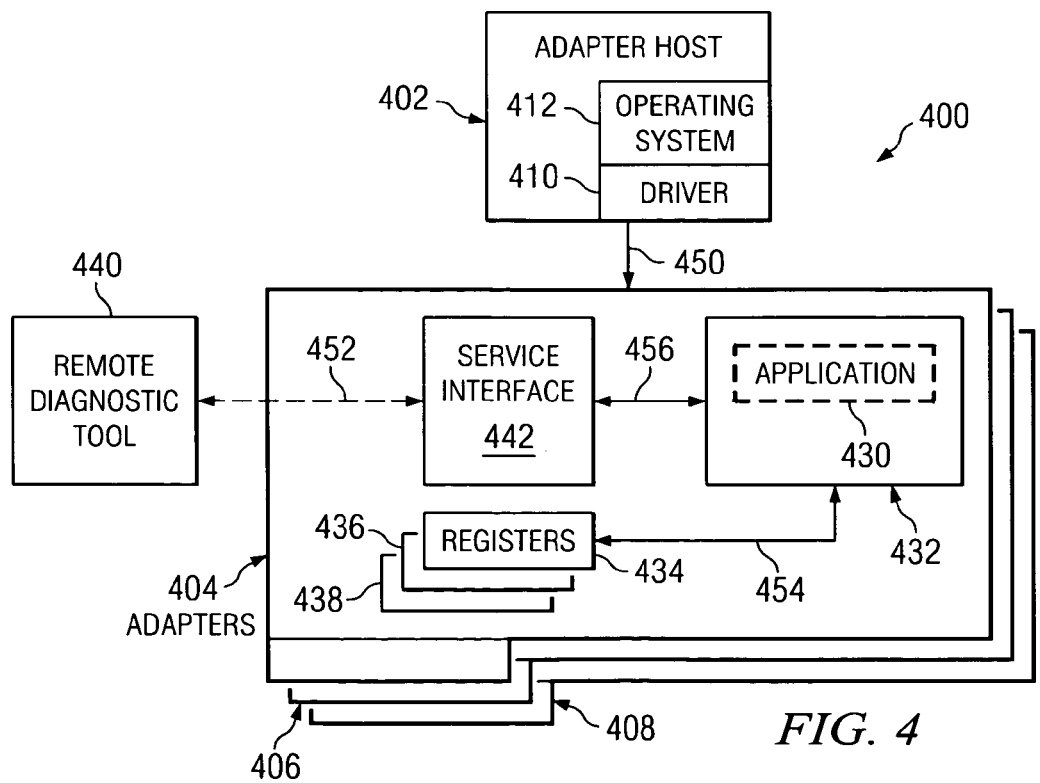
FIG. 4 is a block diagram of a system for analyzing and reporting the status of an adapter in a data processing system in accordance with a preferred embodiment of the invention.

FIG. 4 is a block diagram of a system for analyzing and reporting the status of an adapter in a data processing system in accordance with a preferred embodiment of the invention. The system is generally designated by reference number 400 and includes an adapter host 402 which may, for example, be implemented as server 104 or as one of clients 108, 110 and 112 in FIG. 1, or as one of data processing systems 200 and 300 illustrated in FIGS. 2 and 3. Adapter host 402 includes a plurality of adapters including adapters 404, 406 and 408 illustrated in FIG. 4. Adapters 404, 406 and 408 may, for example, be implemented as one of adapters 220 and 230 in FIG. 2, or as one of adapters 310 to 320 in FIG. 3.

Each adapter 404, 406 and 408 includes various interfaces, buffers, control units and other components that are required to support a particular device with which the adapter is associated. Only those components that are necessary to provide a clear understanding of the present invention are illustrated in FIG. 4. In addition, although FIG. 4 only illustrates components on adapter 404, similar components may also be provided on other adapters of adapter host 402, such as on adapters 406 and 408.

Adapter host 402 includes device driver 410 to control adapter 404, and other device drivers, not shown, to control other adapters of adapter host 402. Device driver 410 may be included within operating system 412 of adapter host 402 as shown in FIG. 4, or it may have been loaded into adapter host 402.

In accordance with an embodiment of the invention, analyzing and reporting system 400 includes service application 430 for providing a variety of service functions to permit data to be captured regarding the status of adapter 404. As shown in FIG. 4, service application 430 resides on service processor chip 432 on adapter 404 that runs the service application. As will be explained more fully hereinafter, communication with service application 430 can be from operating system 412 of adapter host 402 or from an external device such as remote diagnostic tool 440.

Service application 430 includes the capability of performing a variety of basic diagnostic functions to facilitate the analysis and correction of adapter problems that may be encountered. In this regard, when a problem occurs in an adapter, such as adapter 404 in FIG. 4, various diagnostic procedures can be performed to capture data needed to analyze and correct the problem. A developer or a manufacturer, for example, may wish to dump specific controller chip registers or configuration registers on the adapter, or to change the values of certain registers, to see if the problem will disappear or to obtain a better understanding of the nature of the problem.

The mechanisms required to dump controller chip registers or configuration registers or to perform other diagnostic procedures needed to analyze an adapter problem, however, are normally not included in the device driver for the adapter because these mechanisms are not needed for normal adapter operation. Accordingly, in order to properly analyze an adapter problem, it has become the practice for a manufacturer or a developer to modify the adapter's device driver so as to provide the necessary mechanisms to allow the desired diagnostic procedures to be performed. This can be an inconvenient and time consuming procedure.

According to an illustrative embodiment of the invention, service application 430 includes a capability of working in parallel with device driver 410 of adapter 404 to gather, set or clear registers on adapter 404, such as registers 434, 436 and 438 in FIG. 4, and of performing other diagnostic functions to permit data to be captured regarding the status of adapter 404. Application 430, in effect, provides a plurality of secondary or mini-device drivers that that work in parallel with device driver 410 to provide basic service functions including configuration, open, close, transmit and receive, and the like to permit a snapshot of register values on the adapter to be obtained.

With the present invention, accordingly, when a problem is encountered in an adapter, various diagnostic functions can be performed on the adapter using the secondary device drivers provided by service application 430 operating in parallel with the adapter's own device driver without is being necessary to redesign or modify the adapter's own device driver.

Figure 5:
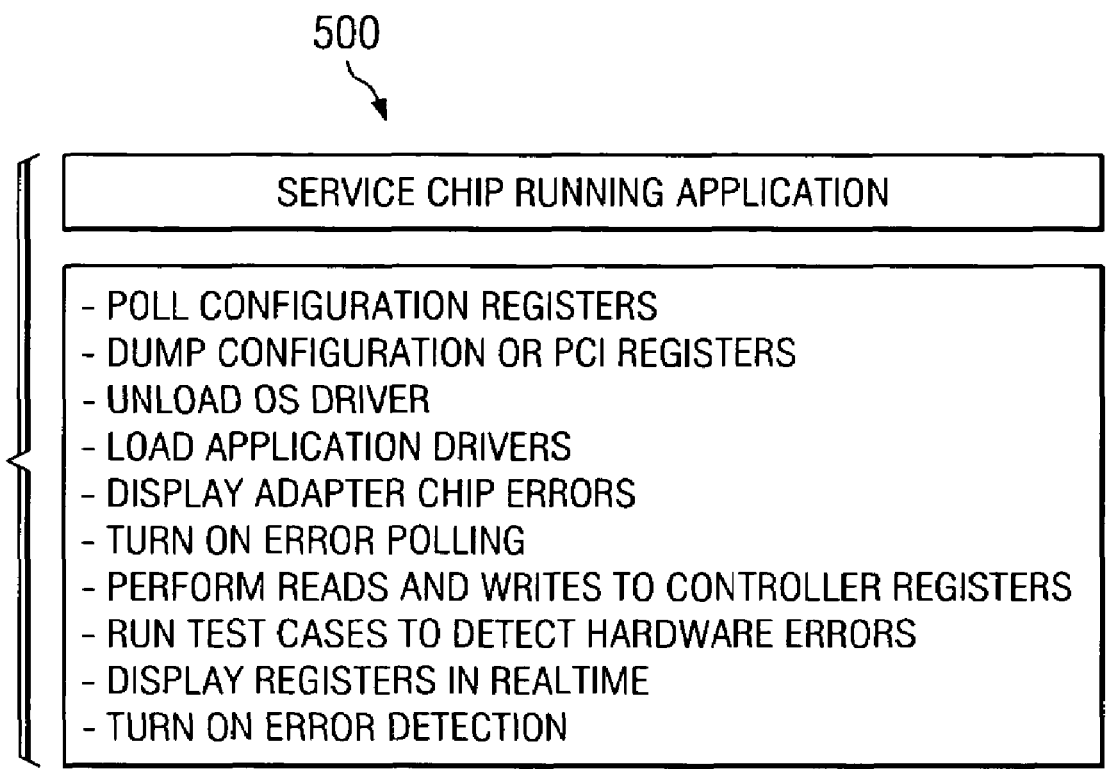
FIG. 5 is a partial listing of capabilities of the analyzing and reporting system of FIG. 4 in accordance with a preferred embodiment of the invention.

Service application 430 in accordance with the present invention provides a manufacturer, developer or other entity with numerous capabilities for analyzing the status of an adapter. FIG. 5 is a partial listing 500 of capabilities of service application 430. As shown in FIG. 5, service application 430 can be used to poll configuration registers, dump controller chip registers or configuration registers on the adapter, unload an operating system driver and load secondary drivers provided by the service application. Service application 430 also provides the capability of displaying adapter chip errors, of initiating error polling and of performing reads and writes to controller chip registers.

Service application 430 can also be used to activate error detection. For example, the application can be used to send out a notification message when a fatal hardware error occurs by flagging the location of the failing adapter; i.e., by identifying the particular adapter that has failed and the particular machine on which the adapter is located. If the adapter does notice a fatal hardware error, a mechanism can be activated to transfer the adapter's functions to another, working adapter in the data processing system to maintain system operation.

Service application 430 can also be used to provide a history gathering capability. For example, the application can maintain a record of problems encountered with respect to a particular adapter. Such a record can include information regarding the frequency of occurrence of a problem, and can be used to compile information to identify if similar problems are occurring on other adapters.

System 400 also includes communication structure to permit data to be transmitted to and received from service application 430. According to an embodiment of the invention, the communication structure enables communication with service application 430 from operating system 412 of adapter host 402, as indicated by arrow 450 in FIG. 4, or from remote diagnostic tool 440, which may be another computer in network 100 in FIG. 1, a PDA or another suitable machine. To enable communication from remote diagnostic tool 440, the communication structure includes service interface 442 on adapter 404. Service interface 442 is a separate communications port that is connected to service application 430 by a connection between interface 442 and service application chip 432, represented by arrow 456 in FIG. 4; and that can enable connection to remote diagnostic tool 440 by a physical cable or by a wireless connection as indicated by arrow 452 in FIG. 4.

The direct connection between adapter 404 and remote diagnostic tool 440 permits instructions to be executed to service application 430 without it being necessary to go through operating system 412 of adapter host 402. Accordingly, service application 430 does not have to run on the same machine, i.e., on adapter host 402, where adapter 404 resides. As a result, if adapter host 402 hangs, one can still communicate with adapter 404 and run diagnostics. Similarly, if adapter host 402 ceases to operate entirely, and the adapter is the cause, i.e., a hardware problem, information regarding the adapter can still be captured from remote diagnostic tool 440.

By providing a wireless connection between adapter 404 and remote diagnostic tool 440, service application 430 can be used to monitor cards in an array of adapters from a remote location, and can alert a system administrator or other entity of critical events. For example, when an adapter problem occurs in the field, for example, at a customer's facility, data regarding the operation of an adapter can be captured by service application 430 and sent electronically to a manufacturer for problem analysis. It will not be necessary for the customer to remove the adapter from a machine and send it back to the manufacturer for analysis. Instead, the manufacturer can capture the data in real time, when the problem occurs, and this will help the manufacturer analyze the problem.

By using Bluetooth technology or another wireless communication network, service application 430 according to the present invention can be used to look at the current state of an adapter in real time while it is configuring or transmitting and receiving, i.e., to watch register values change as the adapter configures or receives/transmits. Such a capability is particularly useful during debugging of a data processing system.

Figure 6:
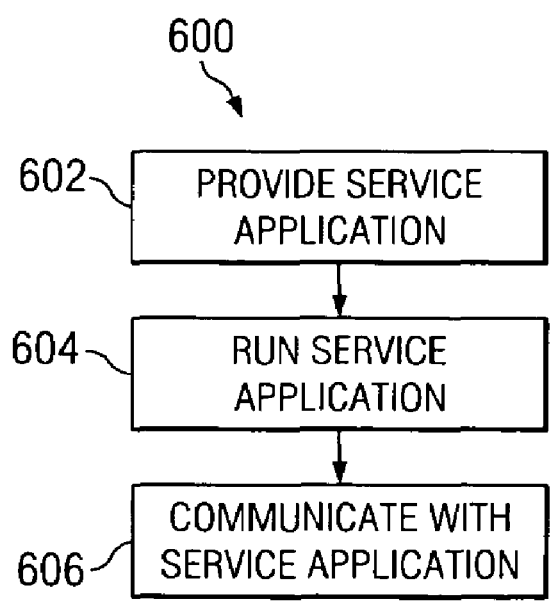
FIG. 6 is a flowchart that illustrates a method for analyzing and reporting the status of an adapter in a data processing system in accordance with a preferred embodiment of the invention.

FIG. 6 is a flowchart that illustrates steps of a method for analyzing and reporting the status of an adapter according to an embodiment of the invention. The method is generally designated by reference number 600 and begins by providing a service application on an adapter that provides at least one service function for capturing data regarding the status of the adapter (step 602). The service application is run to capture data regarding the status of the adapter (step 604), and the captured data is then reported by communicating with the service application (step 606). The captured data can then be used to provide information regarding the status of the adapter.

In general, the present invention provides a system for analyzing and reporting the status of an adapter in a data processing system that includes a service application that provides a variety of service functions to permit data to be captured regarding the status of the adapter, and a communication structure that permits data to be transmitted to and received from the service application. The analyzing and reporting system of the invention facilitates the reporting and diagnosis of adapter problems so that encountered problems can be better understood and more easily corrected.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for analyzing and reporting the status of an adapter in a data processing system, comprising:
    an adapter connectable to a bus of the data processing system for supporting a mechanism with which the adapter is associated;
    a service application on said adapter, said service application providing at least one secondary device driver that works in parallel with a device driver of said adapter for providing at least one service function for capturing data regarding the status of the adapter, wherein the at least one service function comprises at least one of configuration, open, close, transmit and receive; and
    a communication structure on said adapter for transmitting data to said service application and for receiving said captured data regarding the status of the adapter from said service application.

2. The apparatus according to claim 1, wherein said service application resides on a service processor chip on said adapter.

3. The apparatus according to claim 1, and further including:
    at least one register on said adapter; and
    means for providing communication between said service application and said at least one register for enabling said service application to provide said at least one service function, wherein said at least one service function further comprises at least one of gathering, setting and clearing said at least one register.

4. The apparatus according to claim 2, wherein said communication structure includes:
    a communication interface on said adapter; and
    means for connecting said service processor chip to said communication interface for enabling communication between said service application and an external device through said communication interface.

5. The apparatus according to claim 4, wherein said communication interface comprises a cable interface for providing a cable connection between said adapter and said external device.

6. The apparatus according to claim 4, wherein said communication interface comprises a wireless communication interface for providing wireless communication between said adapter and said external device.

7. A system for analyzing and reporting the status of an adapter in a data processing system, comprising:
    an adapter connectable to a bus of the data processing system for supporting a mechanism with which the adapter is associated;
    a service application on said adapter, said service application providing at least one secondary device driver that works in parallel with a device driver of said adapter for providing at least one service function for capturing data regarding the status of the adapter, wherein the at least one service function comprises at least one of configuration, open, close, transmit and receive;
    means for communicating with said service application; and
    communication structure on said adapter for transmitting data from said communicating means to said service application and for transmitting said captured data regarding the status of the adapter from said service application to said communicating means.

8. The system according to claim 7, wherein said service application resides on a service processor chip on said adapter.

9. The system according to claim 7, and further including:
    at least one register on said adapter; and
    means for providing communication between said service application and at least one register for enabling said service application to provide said at least one service function, wherein said at least one service function comprises at least one of gathering, setting and clearing said at least one register.

10. The system according to claim 8, wherein said communication structure includes:
    a communication interface on said adapter;
    means for connecting said service processor chip to said communication interface; and
    wherein said communicating means comprises an external device for communicating with said service application through said communication interface.

11. The system according to claim 10, wherein said communication interface comprises a cable interface for providing a cable connection between said adapter and said external device.

12. The system according to claim 10, wherein said communication interface comprises a wireless communication interface for providing wireless communication between said adapter and said external device.

13. The system according to claim 12, wherein said wireless communication between said adapter and said external device utilizes Bluetooth wireless technology.

14. A method for analyzing and reporting the status of an adapter in a data processing system, comprising:
    providing a service application on an adapter, the adapter being connectable to a bus of the data processing system for supporting a mechanism with which the adapter is associated, said service application providing at least one secondary device driver that works in parallel with a device driver of said adapter for providing at least one service function for capturing data regarding the status of the adapter, wherein the at least one service function comprises at least one of configuration, open, close, transmit and receive; and communicating with said service application from an external device for transmitting data from said external device to said service application and for transmitting said captured data regarding the status of the adapter from said service application to said external device.

15. The method according to claim 14, wherein said adapter includes at least one register, and wherein said providing at least one service function further comprises at least one of gathering, setting and clearing said at least one register.

16. The method according to claim 14, wherein said communicating comprises communicating with said service application from said external device through a communication interface on said adapter without going through an operating system of said data processing system.

17. The method according to claim 16, wherein said communicating comprises communicating with said service application from said external device through a cable connection between said adapter and said external device.

18. The method according to claim 16, wherein said communicating comprises communicating with said service application from said external device through a wireless connection between said communication interface and said external device.

19. A computer program product in a recordable-type computer readable medium, the computer program product executed by a data processing system for analyzing and reporting the status of an adapter in the data processing system, the computer program product comprising:

first instructions for enabling a service application on the adapter to provide at least one service function for capturing data regarding the status of the adapter, the adapter being connectable to a bus of the data processing system for supporting a mechanism with which the adapter is associated, wherein the service application provides at least one secondary device driver that works in parallel with a device driver of said adapter for providing the at least one service function for capturing data regarding the status of the adapter, and wherein the at least one service function comprises at least one of configuration, open, close, transmit and receive; and second instructions for enabling communication between said service application and an external device for transmitting data from said external device to said service application and for transmitting said captured data regarding the status of the adapter from said service application to said external device.

20. The computer program product according to claim 19, wherein said adapter includes at least one register, and wherein said first instructions further include instructions for at least one of gathering, setting and clearing said at least one register.

21. The computer program product according to claim 19, wherein said second instructions include instructions for enabling communication with said service application from said external device through a communication interface on said adapter without going through an operating system of said data processing system.

* * * * *